Nov. 20, 1928.

P. W. KNAUF

GATE VALVE

Filed Sept. 22, 1924

P. W. KNAUF

GATE VALVE

Filed Sept. 22, 1924 4 Sheets-Sheet 2

1,692,177

WITNESS
F. J. Hartman.

INVENTOR
Paul W. Knauf
BY Cyrus N. Anderson
ATTORNEY

Nov. 20, 1928.
P. W. KNAUF
1,692,177
GATE VALVE
Filed Sept. 22, 1924    4 Sheets-Sheet 3
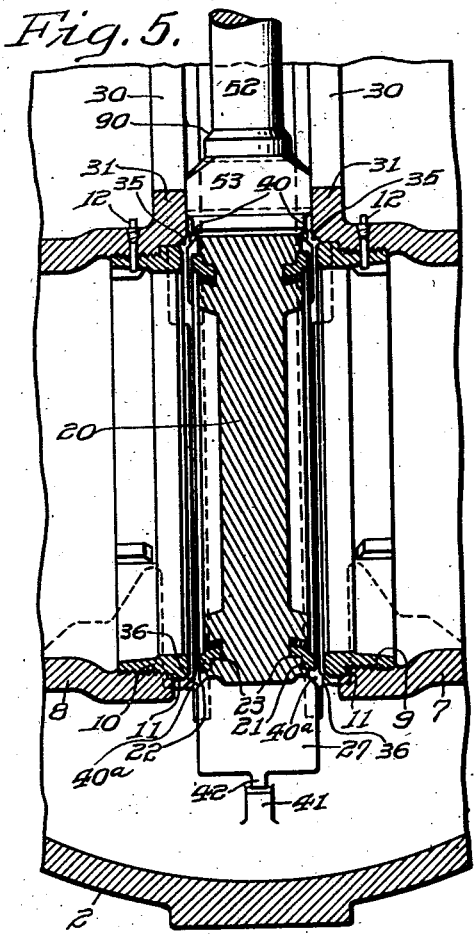
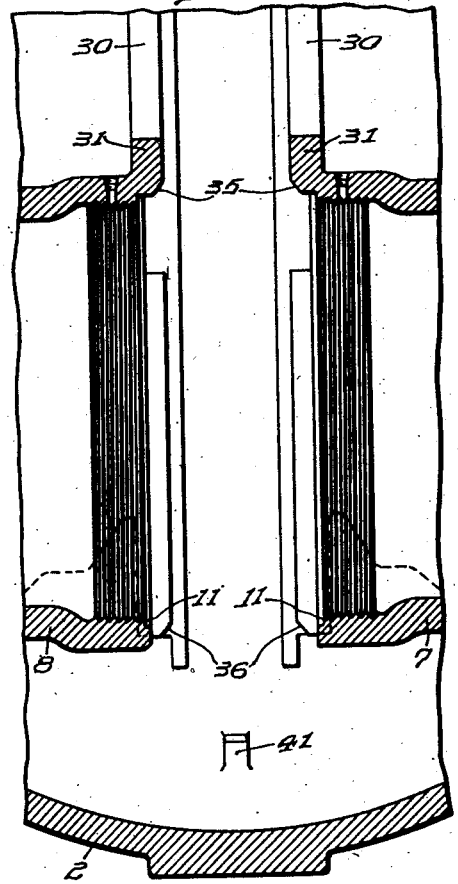
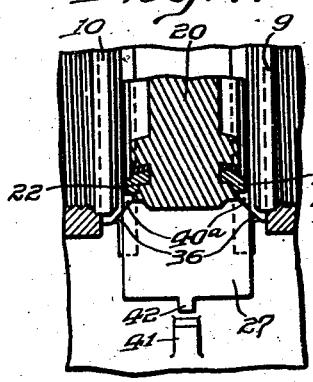
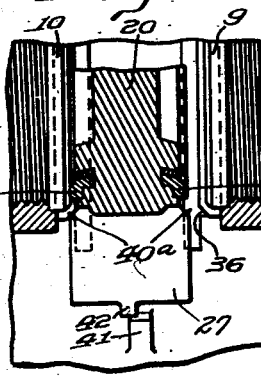
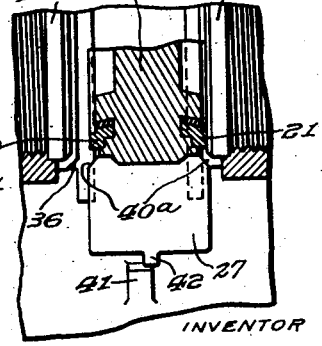

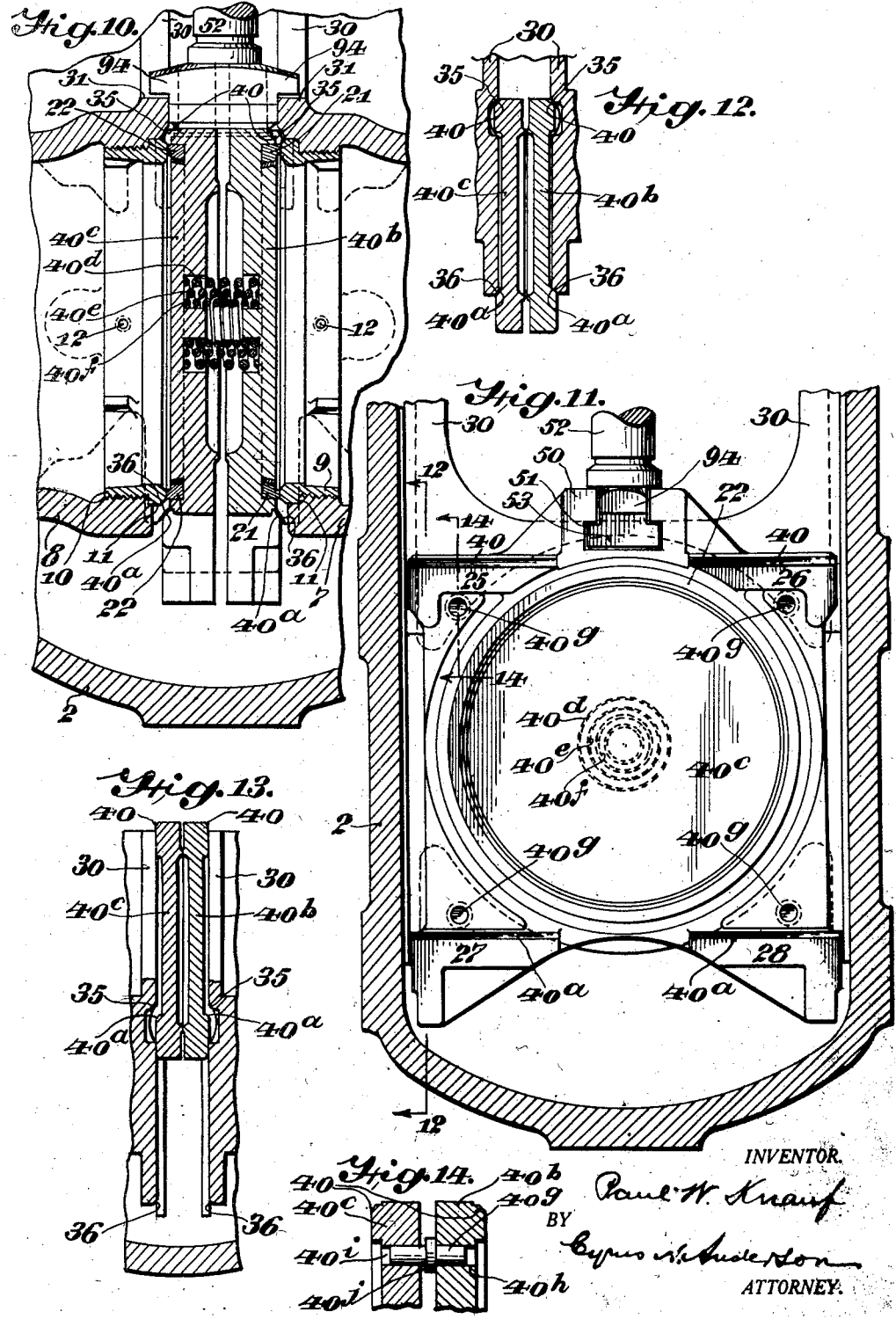

Patented Nov. 20, 1928.

1,692,177

UNITED STATES PATENT OFFICE.

PAUL W. KNAUF, OF CYNWYD, PENNSYLVANIA, ASSIGNOR TO SCHUTTE AND KOERTING COMPANY, OF PHILADELPHIA, PENNSYLVANIA, A CORPORATION OF PENNSYLVANIA.

GATE VALVE.

Application filed September 22, 1924. Serial No. 738,973.

Gate valves of the construction heretofore in use in high pressure steam systems and for other analogous purposes have been more or less unsatisfactory for one reason or another.

One of the principal objections has been that in being moved into and out of closed position the valves slide in contact with their seats with the result that both the faces of the valves and the valve seats are scraped or grooved so as to prevent the formation of a complete closure. A further objection has been that in moving across the valve opening and across the steam pressure line, the pressure of the steam against the edge portion of a valve projecting partially across the said opening would cause or tend to cause a tilting thereof with the result that the tendency to scrape or groove the valve face and the valve seat rings has been increased. Such defects in construction and operation have rendered it necessary to repair the valves and valve seats at more or less frequent intervals which has constituted a source of continuously recurring expense.

The principal object of the present invention is to provide a simple, rugged construction of valve mechanism which will avoid and eliminate the objections heretofore existing in previously known valve structures, some of which are indicated above.

It is also an object of the invention to provide an improved and novel construction of valve mechanism having means whereby the valve in moving across the valve seat and the valve opening is prevented from scraping against the valve seat, whereby the surfaces of the valve seat and of the valve are maintained in good condition for an indefinite period of time.

A still further object of the invention is to provide an improved and novel construction of valve structure having means whereby, as the valve is moved into position across the valve opening, tilting thereof, in any direction, is prevented.

Other objects of the invention are to provide means whereby, when the valve has reached a position near that occupied when it is seated, it is allowed to move toward the valve seat and to become seated against the latter by the action of the steam or other fluid pressure thereon; also to provide supporting lugs which project from different edge portions of the valve which lugs are adapted to co-operate with guides upon the valve body or valve casing which support the valve in spaced relation with respect to the valve seat or seats, as the case may be, until the valve is practically seated.

I shall not, at this point, undertake to point out the many other objects and advantages incident to the invention but such other objects and advantages will be pointed out in the detailed description thereof which follows or will become apparent from such description.

In order that the invention may be readily understood and its many practical advantages fully appreciated, reference should be had to the accompanying drawings in which I have illustrated convenient forms of mechanical embodiment of the same. However, it will be understood that the invention is susceptible of embodiment in other forms of construction than those shown and that changes in the details of construction may be made within the scope of the claims without departing from the said invention.

In the drawings,

Fig. 1 is a longitudinal sectional view of a valve structure embodying the invention;

Fig. 2 is a view of the lower portion of the structure in Fig. 1 taken in a plane substantially at right angles to that in which Fig. 1 is taken and showing the valve body or casing in section and the valve and parts associated therewith in elevation;

Fig. 5 is a central sectional view of a portion of the valve structure taken in a plane extending transversely of the plane of the valve;

Fig. 6 is a similar view with the valve and other parts of the structure omitted;

Fig. 7 is a sectional view of a fragmentary portion of the structure showing the lower portion of the valve in a central nearly closed position;

Fig. 8 is a similar view showing the valve in a position slightly lower than that which is shown in Fig. 7 and also showing the same after it has been moved in one direction against a valve seat;

Fig. 9 is a view similar to that shown in Fig. 8 but showing the valve moved in the opposite direction to effect closing thereof.

Fig. 10 is a central sectional view similar to that of Fig. 5 but showing a modification of the valve structure;

Fig. 11 is a view showing the construction illustrated in Fig. 10 but taken in a plane substantially at right angles to that in which Fig. 10 is taken;

Fig. 12 is sectional view of reduced size taken on the line 12—12 of Fig. 11, the valve being shown in closed position;

Fig. 13 is a sectional view taken on the line 12—12 of Fig. 11 but with the valve in open position; and Fig. 14 is a sectional view taken on the line 14—14 of Fig. 11 showing a detail of construction.

Figure 2:
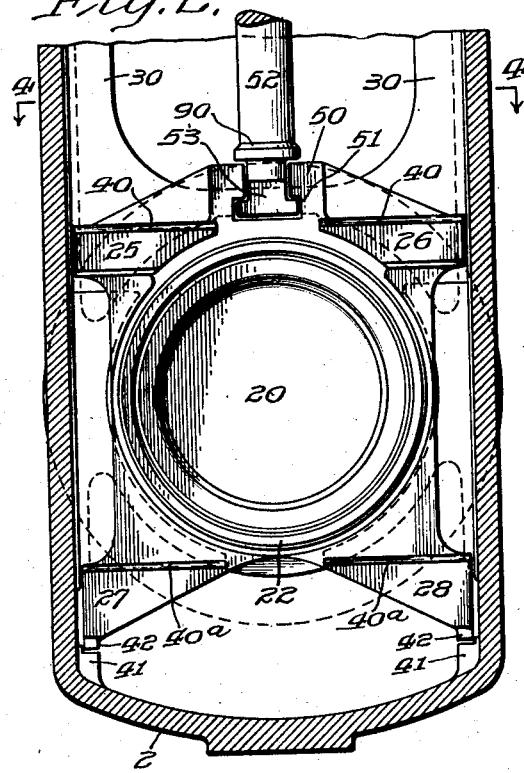

Referring to Figs. 1 to 9 of the drawings, 1 designates a cylindrical casing constituting the valve body, the lower end of which is closed, as indicated at 2, and the upper end of which is provided with a laterally extending flange 3. The said casing is provided with ports 4 and 5 having flanges 6 at their outer ends. These ports are provided with inwardly projecting extensions 7 and 8 which are provided with female screw threads, as indicated for the reception of screw threaded valve seat rings 9 and 10. When the latter are screwed into the projections 7 and 8 so as to bring the exterior shoulders thereon into contact with the shoulders 11 adjacent the inner ends of the said inwardly projecting extensions keeper screws 12 are inserted into openings through the said extensions and into the said rings for retaining the latter in position.

The valve for closing the opening through the valve casing or valve body comprises a body portion 20 which in the contruction shown is circular. The said body is provided adjacent its periphery with face rings 21 and 22 which are mounted in any suitable manner upon the opposite sides thereof for contacting with the valve seat rings 9 and 10. These face rings may be secured in position by rolling the same into grooves 23, by wedging, or otherwise as may be preferred. These face rings are adapted to contact with the inner edge of either of the valve seat rings 9 or 10 depending upon the direction in which the valve shall be moved after it has been moved into position across the opening through the valve casing. It will be understood that if preferred these face rings may be omitted and the surface of the valve body be allowed to contact directly with the valve seat rings.

For the purpose of supporting the valve in central position with respect to the faces of the valve seat rings 9 and 10, I have provided the valve with lugs 25 and 26 and 27 and 28, which lugs project from the periphery of the valve. In the construction, as shown, the lugs 25 and 26 are situated partially above the upper edge portion of the valve while the lugs 27 and 28 are situated wholly below the lower edge portion of the seat valves. It will be understood that the valve structure may be arranged in vertical, horizontal, or any other position and that portions, which in the drawings are shown as the top portions, may be reversed so as to become the lower portions. In other words, the invention is not limited to the particular relative positions of the various parts of the structure. The projections 25 and 26 project upwardly and outwardly while the projections 27 and 28 project downwardly and outwardly. These projections in the movements of the valve into and from closed position are supported between guide flanges 30 upon the interior of the casing 1. These flanges are arranged in spaced parallel relation to each other as shown.

It will be noted that the intermediate portions of these guide flanges 30 are widened and extended, as shown at 31, entirely across the said casing; also that the lower portions thereof are likewise widened, as shown at 33, though such portions do not extend entirely across the casing as they might. The purpose of thus widening and extending the guides will be hereinafter fully pointed out and explained.

The guides are provided intermediate their ends with notches, as indicated at 34, upon their inner sides. The upper edges of these notches are beveled to provide beveled surfaces 35 while the inner edges of the lower ends are beveled to provide beveled surfaces 36.

The lugs 25 and 26 and 27 and 28 are of a thickness to fit snugly between the said guides.

The opposite upper edges of the lugs 25 and 26 are beveled as shown at 40. These beveled edges are adapted to co-operate with the beveled upper edges 35 of the notches 34 when the valve is moving from nearly closed to closed position. The opposite upper edge portions of the lugs 27 and 28 are also beveled, as shown at 40ª, for the purpose of co-operating with the beveled surfaces 36 at the lower ends of the said guide flanges 30. Movement of the valve across the opening through the valve casing to effect closure thereof is adapted to be limited by stops 41 upon the valve casing with which the projections 42 upon the outer edges or ends of the lugs 27 and 28 are adapted to contact. If such contact does take place it should not be until after one or the other of the face rings 21 or 22 has made firm contact with its valve seat ring.

Although in the construction shown, I have provided a couple of guide flanges 30 between which the lugs 25 and 26, and 27 and 28 are guided, it will be obvious that a reverse construction may be employed in which the lugs or other portion of the movable gate or valve are provided with slots or notches which engage a single guide flange upon the valve casing. In function and result the latter construction is identical with the former, the two arrangements being the reverse of one another.

The distance between the guide flanges 30 is less than the distance between the opposing faces of the valve seat rings 9 and 10. Such difference usually amounts to about one-quarter (¼) of an inch so that there is a clearance between the valve lugs 25 to 28 and the valve seat rings of about one-eighth (⅛) of an inch. The purpose of this arrangement is to insure that the gate or valve lugs 25 to 28, inclusive, which are guided by the guides 30 shall not contact with or scrape against the surfaces of the valve seat rings 9 and 10. Likewise the distances between the outer surfaces of the face rings 21 and 22 is less than the thickness of the gate lugs 25 to 28, inclusive, in order to insure that the surfaces of the said face rings shall not contact with the guides 30 as the valve or gate is moved therein in one direction or the other across the valve opening through the valve casing. Ordinarily the difference in these dimensions is about one-quarter (¼) of an inch, leaving a clearance of about one-eighth (⅛) of an inch between the surfaces of the face rings upon the valve or gate and the said guide flanges 30.

In Fig. 1 of the drawing, I have shown the valve in centered position with respect to the valve seat rings 9 and 10 ready to be moved in one direction or the other against one of said rings. It will be understood that in actual use, the pressure of the steam or other fluid against one side or the other of the valve would cause lateral closing movement thereof so as to carry the face rings against one or the other of the valve seat rings.

Thus far the description of my invention relates to the details of construction of the valve and housing per se thereof and not to the means for operating the valve; and in view of the fact that the modifications disclosed in Figs. 10 to 14 inclusive relate to the valve and the housing thereof only it is believed to be appropriate to insert at this point a detailed description of the construction disclosed in said figures.

In these figures the parts 2, 7, 8, 9, 10, 11, 21, 22, 25, 26, 27, 28, 30, 31, 35, 36, 40 and 40$^a$ are substantially identical with the parts correspondingly numbered in Figs. 1 to 9 inclusive of the drawings as previously described.

The valve in the modified construction comprises two plate members 40$^b$ and 40$^c$ which are arranged in parallel relation to each other and the face rings 21 and 22 are mounted in the outer surfaces thereof. Coiled springs 40$^d$, 40$^e$, and 40$^f$ arranged concentrically of each other as shown in Fig. 10 are located between the plates 40$^b$ and 40$^c$ and exert forces oppositely upon the said plates tending to push and hold them away from each other. The diameters of the wires or rods of which the springs 40$^d$, 40$^e$ and 40$^f$ are constructed are different as is indicated in Fig. 10 of the drawings. It will be apparent that by reason of the presence of the said coiled springs between the plates 40$^b$ and 40$^c$ the outer sides of the latter will be held firmly in contact with the valve seat rings 9 and 10 when the valve is in closed position and also with the guide flanges 30 to which reference previously has been made. It will be understood that when the valve is in closed position the pressure of the steam against one side thereof may exert a force sufficient to compress the coiled springs between the plates 40$^b$ and 40$^c$ and thereby cause one of the face rings 21 or 22 to separate from the valve ring seat adjacent thereto. This will not however operate to open the valve because by the same pressure aided by the force of the springs the opposite face ring will be pressed firmly against its seat.

In many cases the integral forms of valve structure 20 shown in the preceding figures will be entirely satisfactory but it may happen that in other cases it is necessary to provide a construction of valve comprising plates with intermediate expanding means of suitable character such as the springs shown for forcing the oppositely disposed parallel plates in opposite directions to cause the face rings 21 and 22 to seat firmly against the valve seat rings 9 and 10. For instance if the valve should be situated in a vertically disposed conduit or tube in which case the valve would occupy a position in a substantially horizontal plane it might be that the force exerted by the steam against the under side of the valve would not be sufficient to hold the upper side of the valve firmly against its valve seat with the result that the steam would be permitted to flow around the edges of the valve and probably would produce what is known as "chattering". In such case if expanding means such as springs are provided as in the modified construction shown such springs would operate to force the opposite sides of the valve away from each other and would at least cause the outer or upper side of the upper valve plate or member to seat firmly against its co-operating valve seat ring thereby effecting complete closure of the valve opening.

For the purpose of holding the valve plates 40 and 40ᵇ and 40ᶜ in proper relation to each other I have provided guiding pins 40ᵍ. These pins are located at the four corners of the valve structure and one end of each of which is driven into an opening 40ʰ in the plate 40ᵇ. Said pins are thereby permanently secured in place in the said plate. The opposite ends of the said pins have sliding engagement with openings 40ⁱ in the plate 40ᶜ. In order to limit the movement of the plates 40ᵇ and 40ᶜ toward each other shoulders or collars 40ʲ are provided upon the middle portions of the said pins so that they occupy positions between the said plates.

When, in the operation of the device, the valve, whether of the form shown in Figs. 1 to 9 or 10 to 14, is moved across the valve opening into position to close the same, lateral movement thereof into closed position is prevented until the lower edges of the beveled surfaces at 40 reach the upper edges of the beveled surfaces 35 and until the lower edges of the beveled surfaces 40ᵃ upon the opposite upper edges of the lugs 27 and 28 reach the upper edges of the beveled surfaces 36 upon the lower ends of the guide flanges 30. If the valve is of solid or integral form as shown in Figs. 1 to 9 inclusive when it has reached this position it is permitted during its further downward movement to move laterally under the pressure of steam in either direction a sufficient distance to cause contact either of the face ring 21 with the bearing surface of the valve seat ring 9 or of the face ring 22 with the valve seat ring 10. Likewise when the valve of the construction shown in Figs. 10 to 14 inclusive has reached such position its oppositely disposed plate members are permitted during the further downward movement thereof to move laterally under the pressure of the expanding means, for example the springs, so as to cause contact of the face rings 21 and 22 with the valve seat rings 9 and 10.

It will be seen that the amount of movement of the valve across the bearing surfaces of the valve seat rings, if any, after contact therewith is negligible. The result of this is that there is no possibility of the deformation of the contacting bearing surfaces by the cutting of grooves therein or otherwise disfiguring the same. In consequence of this the necessity of repairing the contacting surfaces of the valve seat rings and the valve faces is reduced to an absolute minimum.

For the purpose of effecting movements of the valve, whether of one construction or the other, into and from closed position, I have provided the same with a projection 50 having a T-slot 51 therein. The said projection extends radially from the valve 20 and longitudinally of the cylindrical valve casing 1. The valve spindle 52 is provided at its inner end with a T-shaped head 53 which is in engagement with the T-slot 51. It will be understood that when the valve 20 and the plate members 40ᵇ and 40ᶜ constituting modified valve constructions move laterally in one direction or the other at the end of the closing movement or at the beginning of the opening movement as above described the projection 50 slides with respect to the T-head 53. There is at such time no movement of the T-head 53 because at such time the oposite ends of the said head contact with the opposing side of the heads of the guide flanges 30.

The upper end of the body or casing 1 is closed by means of a cover 60 provided with a stuffing box 61 surounding the outer end of an opening 62 through which the valve spindle 52 extends. The stuffing box is provided with packing or stuffing 63 which is compressed and held in place by a gland 64 which in turn is adapted to be pulled or forced inwardly by means of nuts 65 upon the upper ends of pivotally supported bolts 66 which extend through openings in ears or projections which extend outwardly from the upper end portion of the said gland.

A pair of yoke arms 70 (only one of which is shown) extends upwardly from the cover 60 and terminates in an arch 71 provided with a cylindrical extension 72 into and through which the upper screw threaded end of the valve spindle 52 extends. An elongated nut 73 is in engagement with the screw threaded upper end portion of the valve spindle or valve actuating rod 52. The inner end of said nut projects into the cylindrical extension 72 and is seated against the bridge 71. The said nut is provided adjacent its inner end with a shoulder 74 upon which rests a ball bearing structure 75 which is retained in place by a flanged sleeve 76, the flange of which is secured to the upper end of the cylinder 72 by means of bolts 77. A spur gear 80 is secured to the nut 73 adjacent its outer end, being retained thereon by a nut 81.

The said gear is in engagement with a gear or pinion 82 which is mounted upon the shaft of an electric motor 83, which is supported upon projections or pads 84 and 85, the first of which is integral with the bridge 71 while the latter is integral with or projects from the flanged sleeve 76. It will be obvious that if the gear 80 is driven by the shaft of the motor 83 the nut 73 to which the said gear is rigidly connected will likewise be rotated and will effect axial movement of the valve spindle 52 to cause movement of the valve either into or from closing position. If the nut 73 is rotated to the right inward movement of the valve spindle 52 is effected to cause movement of the valve inwardly across the valve opening, whereas, if it is turned in the opposite direction, reverse movement of the spindle and valve is effected.

Figure 3:
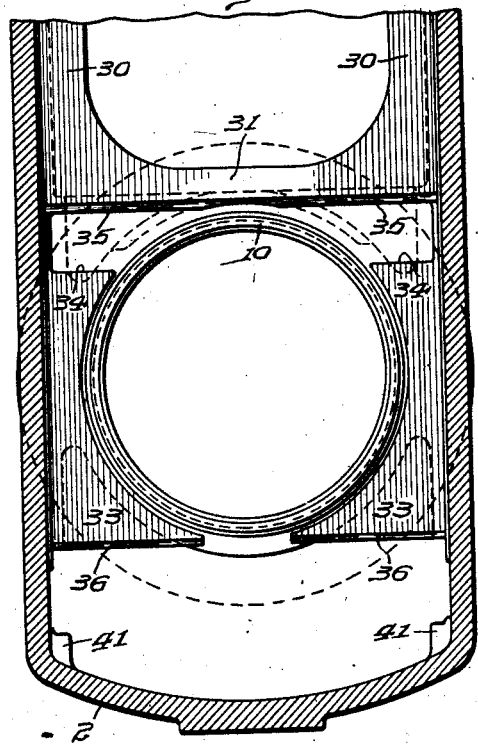
Fig. 3 is a view similar to that shown in Fig. 2 but with the valve and the portion of the valve spindle shown in said Fig. 2 omitted.
Figure 4:
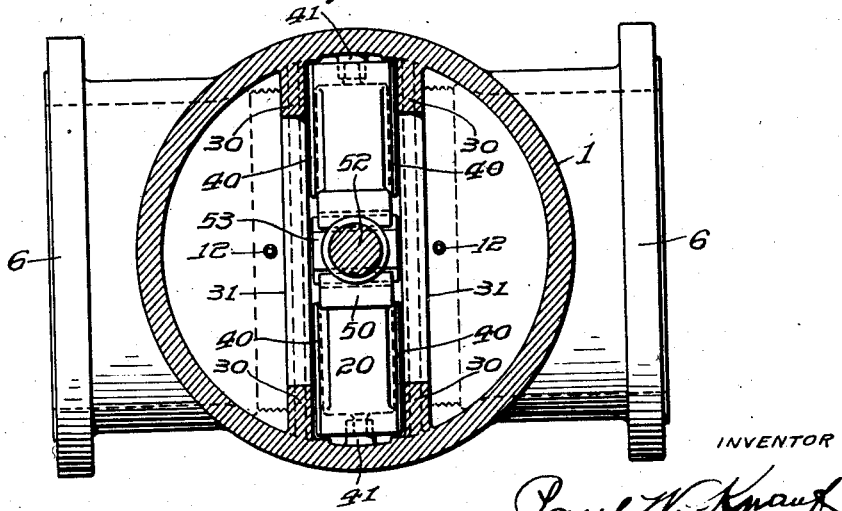
Fig. 4 is a transverse sectional view taken on the line 4—4 of Fig. 2.

As above stated, the intermediate portions and also the lower end portions of the guide flanges 30 are widened as is clearly shown in Fig. 3 of the drawings so that as the valve is moved inwardly and as it extends further across the valve opening so that the pressure of the steam or other fluid against the same increases the bearing surfaces of the guide flanges which resist such pressure are likewise increased so that an increase of the unit pressure of the lugs 25 and 28, inclusive, upon a guide flange is prevented.

The pairs of lugs 25 and 26, and 27 and 28 are located a distance apart such that when the valve has been moved into open position the lower pair partially overlaps the notches 34 in the guide flanges 30 while the upper pair does not extend or project beyond the end of the casing 1.

In the construction of a valve embodying the invention, care should be taken to space the pairs of lugs with respect to each other and to relate the same to the guide flanges 30 and the open end portion of the casing 1 so that when moved into open position the said lugs shall not become disengaged from the said flanges; that is to say, the lower lugs should not be permitted to fall into the notches 34 nor should the upper pair of lugs be permitted to extend beyond the outer ends of said flanges.

When the valve is moved from closed into open position, the beveled shoulder 90 upon the lower end portion of the valve spindle upon the upper end of the T-head 53 engages the valve seat 91 surrounding the lower inner edge of the opening in the cover 60 through which the valve spindle 52 extends. Engagement of the shoulder 90 with the beveled seat 91 entirely closes the space around the spindle 52 so as to prevent the access of steam to the stuffing box 61 whereby the stuffing or packing may be renewed if desired.

If desired the spindle 52 may be manually operated by means of the hand wheel 93 which is secured to the gear 80 previously referred to.

In the construction as shown in Figs. 1 to 9 inclusive contacting stops or projections 41 and 42 are provided for limiting the downward movement of the valve but in the modified construction shown in Figs. 10 to 14 a different means is employed for limiting the downward movement of the valve structure. The said means comprises lateral projections 94 upon the T-shaped head 53 the lower sides of which are adapted to contact with the upper sides of central portion 31 previously referred to. It will be apparent that the presence of the projections or lugs 94 limits the downward movement of the valve structure comprising the plates 40 and 40°.

Although not shown means is provided as usual in gate valve structures where high pressures are employed, for equalizing the pressure on opposite sides of the valve before undertaking to unseat the same to effect opening thereof.

It may be noted here that any suitable and preferred means may be employed for operating or actuating the valve spindle 52 and that my invention is not limited to any particular means which may be employed for that purpose, nor is my invention limited to any particular gate valve structure.

The essential idea of the invention is that means shall be provided whereby in the movement of the valve or gate across the valve opening to place the same either in closed position or in open position, the valve faces are not permitted to contact with or scrape against any portion of the valve structure, particularly the valve seat rings. In the case of the valve or gate 20 it is permitted to move laterally in one direction or the other into contact with the valve seat rings only after the said valve has reached a nearly closed position. After it has reached such position, lateral movement thereof under the influence of the steam or other pressure, is permitted with, at the same time, slight movement transversely of the valve seat surfaces; that is, in the general direction of the plane of the valve. In the case of the modified construction of the valve comprising the plates 40$^b$ and 40$^c$ the said plates are permitted to move laterally after they have reached a nearly closed position, and during such lateral movement the said plates have slight movement transversely of the valve seat surfaces. By reason of the engagement of the valve lugs 25 and 26 and 27 and 28 with the guide flanges 30 tilting of the valve is prevented not only with the result as above described but also with the result that the force necessary to effect movement of the valve across a steam line is decreased.

It will be seen that by my invention I have provided a valve structure which is simple, which may be manufactured economically, and which after having been assembled and put into use may be employed indefinitely without the necessity of renewing, repairing or resurfacing the surfaces of the valve seat rings or the portions of the surfaces of the valve which contact with or are seated against the said rings.

Having thus described my invention, what I claim and desire to secure by Letters Patent is:

1. In a valve structure, the combination of a valve casing having an opening extending therethrough and being provided with a valve seat and being also provided with guides in oppositely disposed relation to each other, intermediate and lower end portions of said guides being wider than the remaining portions thereof, a valve having projections which extend from the periphery thereof, which projections are adapted to engage the said guides and to slide in contact therewith, the areas of the contacting surfaces of the said projections and guides increasing as the valve approaches closed position, and the said guides and projections guiding the said valve in spaced relation to the said seat until it reaches a nearly closed position, and the said guides having means whereby thereafter the said valve may move laterally into closed position into contact with the said valve seat.

2. In a valve structure, the combination of a valve casing having an opening therethrough and being provided with a valve seat and also being provided with guides arranged in parallel spaced relation to each other, intermediate and lower end portions of the said guides being wider than the other portions thereof, a valve having lugs which project from the periphery thereof in radial directions, the thickness of the said projections being greater than the thickness of the said valve and the said projections being arranged in couples and in engagement with the said guides, the areas of the contacting surfaces between the said lugs and the said guides increasing as the valve approaches closed position, the said valve being guided in spaced relation to the said valve seat while it is being moved to the last mentioned position, and the said guides having means for thereafter permitting lateral movement of the said valve into closed position against said seat.

3. In a valve structure, the combination of a valve casing having an opening therethrough and being provided with valve seat rings and also being provided with parallel spaced guides, the distance between the inner opposing surfaces of which is less than the distance between the inner opposing surfaces of the said valve seat rings, intermediate and lower end portions of the said guides being wider than other portions thereof and the lower inner edges of the intermediate and lower end portions being beveled, a valve having lugs which project radially from the periphery thereof, which lugs are adapted to slidably engage between the said guides, and the said lugs each being provided upon their upper outer edges with beveled surfaces which are adapted to co-operate with the beveled edge surfaces upon said guides, and the said lugs being adapted to engage the wider portions of the said guides as the said valve approaches and reaches a nearly closed position at which time the beveled edges of the said guides and the said lugs come into engagement whereby the said valve is adapted to move laterally into closed position.

4. In a valve structure, the combination of a valve casing having an opening therethrough and also having valve seats and guide flanges parallel with the said valve seats, the distance between the inner opposing surfaces of the said guide flanges being less than the distance between the said valve seats, intermediate portions of the said guide flanges being widened and being provided with notches, the upper edges of which are beveled and the lower portions of the said guide flanges being likewise widened and the lower inner edges thereof beveled, a valve having lugs which project laterally from the periphery thereof, two of said lugs being at the upper edge portion of the said valve and the other two being at the lower edge portion thereof, and the upper edges of the said lugs being beveled to co-operate with the beveled surfaces upon the said guide flanges and the said valve being provided with bearing surfaces upon its opposite sides, the distance between the surfaces being less than the thickness of the said lugs whereby during movement of the said valve back and forth between the said guides the said surfaces are prevented from contacting with the said guides and also are prevented from contacting with the valve seat rings, and the said beveled surfaces permitting lateral movement of the said valve from a nearly closed to closed position.

5. In a valve structure, the combination of a valve casing having an opening therethrough and being provided with valve seats surrounding said opening and arranged in spaced relation to each other, and the said casing also having guide flanges in spaced parallel relation to each other, the distance between the inner opposed faces of the said guide flanges being less than the distance between the said valve seats, intermediate portions of the said guide flanges being widened so as to extend across or substantially across the interior of the said valve casing and the inner end portions of the said flanges being likewise widened, the inner sides of the intermediate portions of the said flanges being provided with notches the upper edges of which and the lower inner edges of the said flanges being beveled, a valve having lugs which project radially from its periphery, which lugs are situated between and are adapted to be guided by the said guide flanges, the upper opposite edges of the said lugs being beveled to provide beveled surfaces for co-operating with the beveled surfaces upon said guide flanges, a spindle for actuating said valve to move the same into open and closed position, the said valve being adapted to slide laterally with respect to the said spindle, and the lower end of said spindle, when the valve is in nearly closed position, occupying a position between the intermediate widened portions of the said guide flanges whereby upon movement of the said valve in either direction from a very nearly closed to closed position binding between the said valve and its spindle is prevented.

6. In a valve structure, the combination of a valve casing having an opening therethrough and being provided with a valve seat ring surrounding the said opening, a valve, stationary means for guiding said valve in both its closing and opening movements in spaced relation to the said valve seat ring to and from a point in which it occupies a nearly closed position, and means having connection with the said valve to effect positive movement thereof across the said opening, and the said guiding means having stationary means for permitting movement of the said valve automatically laterally from its nearly closed to closed position.

7. In a valve structure the combination of a valve comprising two plate-like members arranged in spaced parallel relation to each other, each having a projection provided with a T-slot therein, elastic means located between the said members and exerting force tending to move the said members away from each other, a valve casing within which the said valve is located, said casing being provided with a couple of annular valve seats arranged in opposed spaced parallel relation to each other, means for slidably guiding the said members with their outer surfaces in spaced relation to the said valve seats when the said valve is being moved into and out of closed position, means for permitting lateral movements of said members from a nearly closed to closed position thereof, and a valve spindle the lower layer of which terminates in a T-head which is in engagement with said T-slots and having means thereon for limiting the movement of the said valve.

8. In a valve structure the combination of a valve comprising two plate-like members arranged in spaced parallel relation to each other, elastic means located between the said members and exerting a force tending to move the said members away from each other, a valve casing within which the said valve is located, said casing being provided with a couple of valve seats in opposed spaced relation to each other, means for slidably guiding the said members with the outer surface thereof in spaced relation to the said valve seats, means for moving the said valve into and out of closed position, and stationary means for permitting the said elastic means to effect automatic lateral movements of said members from a nearly closed position to closed position thereof.

In testimony that I claim the foregoing as my invention I have hereunto signed my name this 17th day of September A. D., 1924.

PAUL W. KNAUE.